March 19, 1935. J. O'CONNELL ET AL 1,994,896
MEANS FOR BLENDING BUTTER
Filed June 20, 1933 2 Sheets-Sheet 1
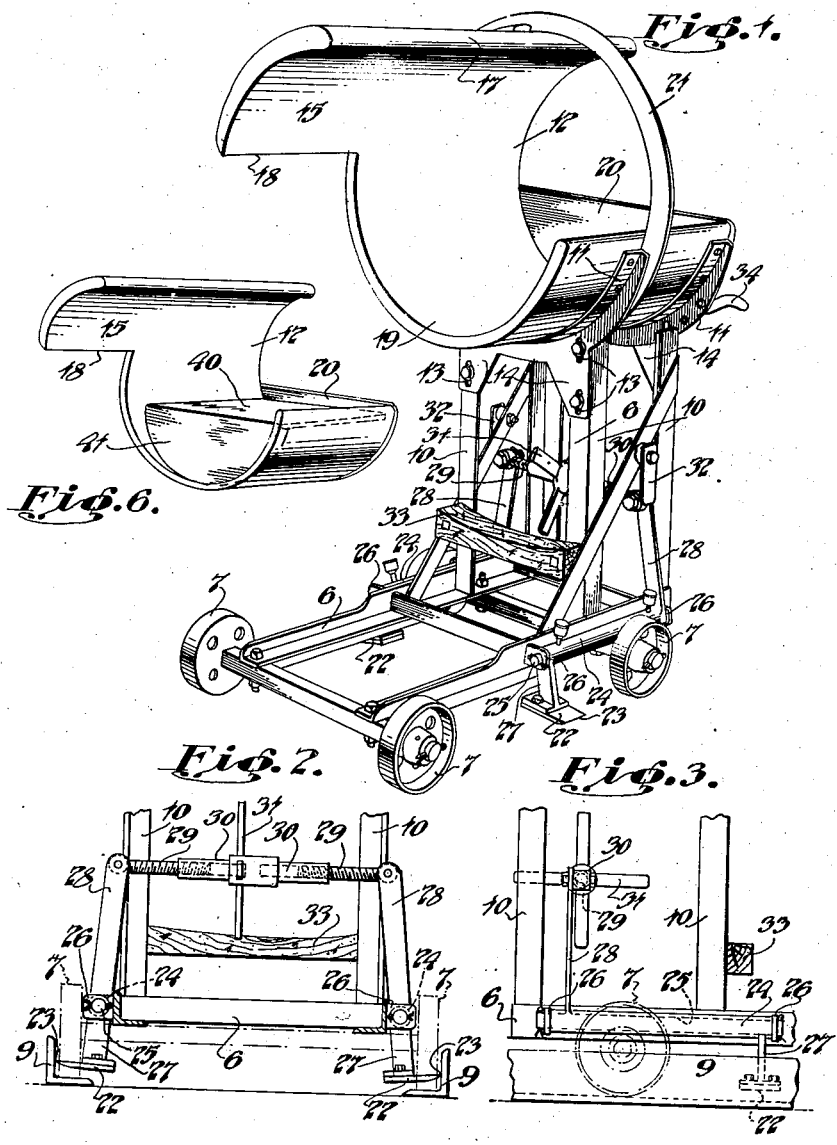
J. O'Connell
H. H. Kerr
INVENTORS
By Marks & Clerk
ATTYS.

March 19, 1935.  J. O'CONNELL ET AL  1,994,896
MEANS FOR BLENDING BUTTER
Filed June 20, 1933    2 Sheets-Sheet 2

J. O'Connell
H. H. Kerr
INVENTORS

By: Marks & Clerk
ATTYS.

Patented Mar. 19, 1935

1,994,896

UNITED STATES PATENT OFFICE 1,994,896

MEANS FOR BLENDING BUTTER

Joseph O'Connell and Harold Hamilton Kerr, Kensington, Victoria, Australia

Application June 20, 1933, Serial No. 676,756
In Australia September 29, 1932

8 Claims. (Cl. 31—1)

This invention has reference to a means for blending butter and is particularly adaptable to rotary churns.

Hitherto during the manufacture of butter, i. e., treatment within a rotary churn worker, the butter is washed and salted and worked by the usual working elements operating within the churn worker, and during such working process it has been found that portion of the butter receives varying treatment, i. e., different proportions of salt and water with the result that the composition of butter after treating operations is not of uniform character, some portions containing a greater percentage of moisture and/or salt than others.

Various types of mechanism have been devised and embodied within a churn barrel to endeavor to blend the butter so as to obtain a composition of uniform character, but the disadvantage of such types resides in the difficulty which is experienced in cleaning the mechanism with which comes into contact the cream prior to it being formed into butter.

The main object of the present invention is to overcome the foregoing disadvantages and to provide an independent blending element that may be readily applied to and inserted into a churn barrel at the will of the operator during the treatment of the butter to result in same being thoroughly mixed and a butter of uniform composition being obtained.

With the above object in view the present invention consists in a blending element disposed on a portable frame adapted to be positioned in relation to a churn barrel so that the effective portion of the element takes up a position within the barrel whereby that portion of the butter at the time not passing through the workers on falling is deposited on to the blending element and directed so that the front end of such portion (which portion is in the form of a layer of butter extending for the length of the working element) is transferred to the rear of the churn barrel and similarly the rear portion transferred to the front of the churn barrel. This operation takes place with each set of workers at the approximate same position on each revolution of the churn barrel, resulting in portion of the butter from one end of the churn being consistently displaced to effect a thorough mixing and obtain a composition of butter of uniform character.

An apparatus according to the invention is preferably adapted to rotary churns carrying working elements and may be used in conjunction with a plurality of churns since it is an independent unit.

Preferably the blending element is adjustable on its frame so as to be moved vertically or laterally to compensate for any wear that may take place in the working parts of the frame or the plate in the working parts of the frame or the churn, such adjustment being necessary to regulate the height of the element in relation to the respective churn worker with which it is to be used in order that the element may be correctly placed in operative position.

The lower portion of the element may be of desired formation and adapted to contain salt or the like, one end of such portion, when the apparatus is in set position, being adjacently disposed to the opening in the churn barrel and preferably of a similar contour, to facilitate the salt being transferred into the churn barrel, means being provided for clamping the apparatus in operative position.

If desired the lower portion of the element forming the salt container may be constructed to form a horizontal platform on which salt may be disposed the end of the platform nearest the churn barrel coinciding with the upper edge of a downwardly inclined deflector plate employed to return any particles of butter that may possibly be ejected from the churn barrel during operation.

There may also be a guard preferably in the form of an angle iron ring or band surrounding the blending element and salt container to safeguard the operator's hands from coming into contact with the moving parts of the churn worker during operation.

Other features of this invention are described hereinafter with reference to the accompanying drawings in which:—

Figure 1 is a perspective view of the blending element mounted on a portable frame.

Figure 2 is a fragmentary front elevation of the blender frame showing the clamping mechanism with its grips in engagement with the angle iron guides.

Figure 3 is a side elevation of Figure 2.

Figure 6 is a fragmentary perspective view of a modification of the blending element in combination with a salt reception platform and deflector plate.

Figure 4:
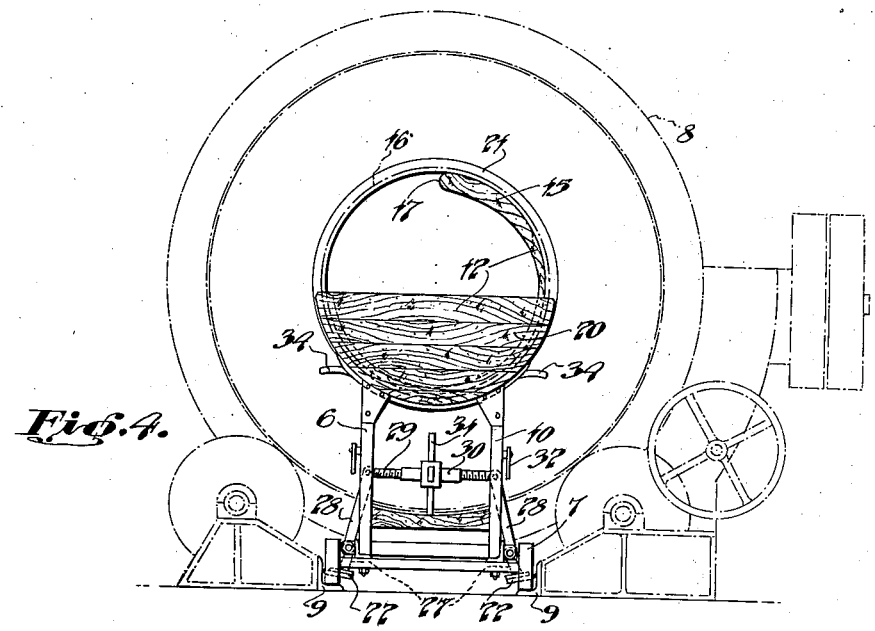
Figure 4 is a front elevation of a churn worker showing the blender in operative position therewith.

One particular form of carrying our invention into practical effect will now be described by way of example as applied to a rotary churn worker carrying working elements the invention comprising a metal framework 6 the lower end of which is preferably of rectangular formation and has mounted thereto wheels or rollers 7 for the purpose of positioning the lower portion of the frame 6 beneath a churn barrel 8, suitable angle iron or other guides 9 being provided beneath said churn 8 for directing the wheels 7.

Vertical standards 10 are mounted on each side of one end of the rectangular base portion of the frame 6 and are adapted to carry in a detachable and adjustable manner segmental sections 11 which in turn support and carry the blending element 12. These supporting sections 11 are mounted to the vertical standards 10 by bolts passing through openings in the upper end of said standards 10 and elongated openings 13 in a flanged projection 14 integral with the supporting sections 11 to enable said sections 11 to be adjusted vertically so that the blending element 12 carried by them may be correctly positioned in relation to the churn 8 with which it is to be employed.

Figure 5:
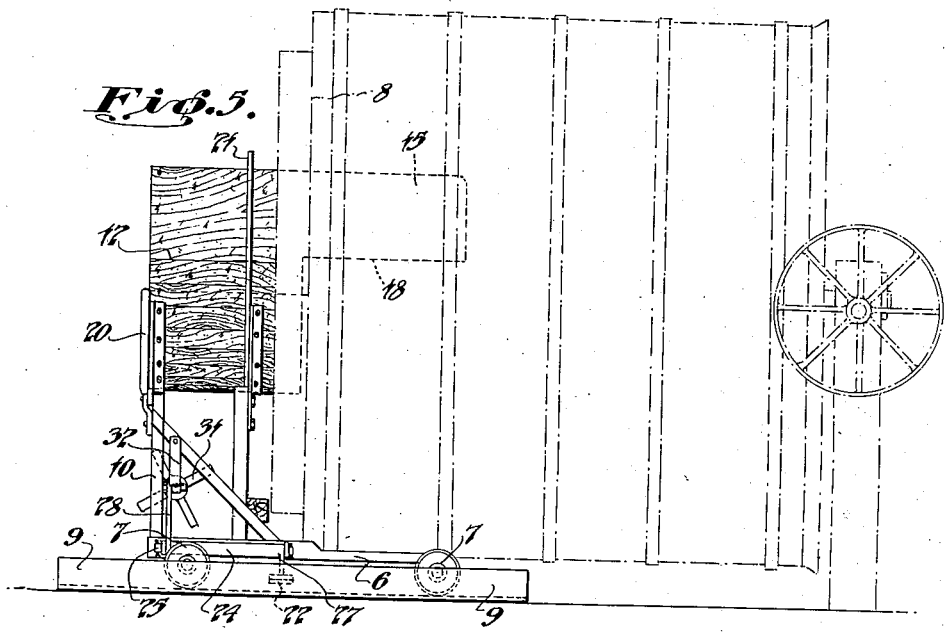
Figure 5 is a side elevation of Figure 4.

The blending element 12 is preferably comprised of wood and is of such a shape as to preferably form a portion of a hollow cylindrical casing the lower peripheral surface being supported by and mounted to the adjustable metal sections 11 forming part of the metal framework construction 6. The upper part 15 of the element 12 forms the effective portion of the blender and extends longitudinally beyond the lower portion and is of a shape to preferably concentrically conform to the circular opening 16 in the front face of the churn barrel 8. The said effective portion 15 preferably forms a segment of a circle and is adapted when the supporting metal frame 6 is in operative position to protrude a desired distance, for example one third of the depth of the churn 8, into and towards the centre of the churn 8 and parallel to the lonigtudinal centre line as illustrated in Figure 5. As a result, this arrangement permits the layer of butter at the time not passing through the working elements incorporated in the churn 8 to be deposited on to the external surface of the inserted or effective portion 15 of the blending element 12 so that when the major part of the layer of butter overbalances and falls, resulting in the front end of such portion being transferred to the rear of the churn 8, the rear portion is similarly transferred to the front of the churn, which operation takes place in conjunction with each set of workers on practically every revolution of the churn 8. By this operation portion of the butter from each end of the churn is being consistently displaced to effect a thorough mixing and obtain a composition of butter of uniform character.

In the exceptional cases where the layer of butter from the working elements of the churn is not completely reversed in direction after contacting with the effective portion 15 of the blending element 12 it is partly reversed by the major portion overbalancing and taking up a position at right angles to its former horizontal position in which vertical position the said layer falls towards the bottom of the churn 8 and in doing so results in a large proportion of said layer remaining approximately midway between the front and back of the churn barrel 8, further ensuring that the butter is being consistently displaced to effect a thorough mixing and obtain a composition of uniform character.

The segment forming the effective portion 15 of the blending element 12 is so disposed in relation to a churn barrel 8 when in operative position therewith that the upper edge 17 of said segment 15 is in approximate alignment with the vertical centre line of the churn barrel 8 the arc of the segment 15 being of required length so that the lower edge 18 of the segment 15 is positioned in desired relationship to the respective working element of the churn from which and at the time the layer of butter is deposited.

The lower portion of the blending element 12, which is mounted to the adjustable metal sections 11 and preferably in the form of a segment, is closed at the front end as at 20 so as to form a receptacle 19 for holding salt, the open end of the said receptacle 19 when the frame is in operative position with a churn barrel 8 being adjacently disposed to and in close proximity with the opening 16 in the churn barrel 8, with which the said segment is preferably concentric, in order that the salt from the receptacle 19 may be easily transferred into the churn barrel 8.

In a modification of the invention as illustrated in Figure 6 the lower portion of the element forming the salt container may be constructed to form a horizontal platform 40 on which salt may be disposed the end of the platform 40 nearest the churn barrel coinciding with the upper edge of a downwardly inclined deflector plate 41 employed to return any particles of butter that may possibly be ejected from the churn barrel 8 during operations.

Mounted to and around the circumference of the complete blending element 12 at a required position is an angle iron or other suitable guard 21 for protecting the operator's hands during the blending operation from coming in contact with the fixtures disposed on the front of the rotating churn barrel 8. This guard 21 also acts as a reinforcing ring and gives the element the required rigidity.

In order to maintain the blending element 12 in set position during the blending operation clamping means are provided which means may preferably comprise wedge shaped grips or shoes 22 disposed one on either side of the lower portion of the frame 6 and adapted to be actuated so as to register with the respective upright flanges of the angle iron guides 9 positioned below the churn barrel 8; the actuating mechanism causing the grips 22 to be moved laterally in opposite directions and at the same time upwardly so that the gripping edges 23 of the wedges 22 engage with the vertical flanges of the angle iron guides 9, which action tends to force the frame 6 down firmly on the angle iron 9 and maintain said frame 6 in a determined position.

The wedges 22 forming the gripping means are detachably mounted to the lower end of respective operating levers pivotally mounted on either side of the frame 6 to enable said wedges 22 to be repaired or replaced should it become necessary.

Each operating lever preferably comprises a horizontal member 24 rotatably mounted on a longitudinal shaft 25 supported by lugs 26 projecting from the lower portion of the base side members of the frame 6, one end of the horizontal member 24 being positioned approximately midway between the front and rear of the frame 6 and having a downwardly projecting lever 27 to the lower end of which is mounted the gripping wedge 22. The other end of the horizontal member 24 has an upwardly projecting lever 28 to the upper end of which is pivotally mounted one end of a threaded horizontal spindle 29 extending towards the centre of the frame 6, the free end of said spindle 29 engaging with a tapped opening in an extended boss 30 of an operating wheel or device 31 centrally positioned within the frame 6 beneath the blending element 12. These spindles 29 extending from each side of the frame 6 are in alignment and both engage with the operating wheel 31, one spindle having a right hand thread and the other a left hand thread so that on the rotation of the operating wheel 31 the spindles 29 are made to traverse in opposite directions. Suitable stops 32 are provided to determine the outward travel of the spindles 29 and prevent same from becoming detached from the tapped boss 30 of the operating wheel 31 during the operation of releasing the grips 22 from engagement with their respective angle irons 9.

The action of the clamping means is as follows:—After the frame 6 of the blender 12 has been placed in operative position under the churn barrel 8 the operating wheel 31 of the clamping mechanism is rotated in a direction to draw the threaded spindles 29 toward each other, which action forces the gripping wedges 22 outwardly against the vertical flanges of the angle iron guides 9 positioned under the churn 8 and maintains the frame 6 of the blender 12 in a fixed position.

Mounted on the blender frame 6 in a suitable position is a stop 33 which determines the forward movement of the frame 6 under the churn barrel 8 so that the lower portion of the blending element, which is the end of the receptacle 19 for holding salt, does not contact with the face of the churn 8; suitable handles 34 are also provided for the purpose of moving the frame 6 into a desired position.

We do not wish to be arbitrarily confined to details since we may if necessary have to depart therefrom, and, while we have described the essential characteristics of our invention, we desire it to be understood that various suitable improvements and modifications may be embodied in the invention without departing from its spirit and scope.

What we claim as our invention and desire to secure by Letters Patent is:—

1. A butter blender, including a portable frame, an independent blending element adjustably mounted on the portable frame the upper portion of said element forming a segment and projecting longitudinally beyond the lower portion and when disposed in operative position in relation to a churn barrel having its upper edge in approximate alignment with the vertical centre line of the churn barrel.

2. In a butter blender, a portable frame adapted to be arranged adjacent a churn barrel, an independent blending element adjustably mounted on the portable frame, the upper portion of said element projecting longitudinally beyond the lower portion and forming a segment adapted to be positioned within the churn barrel, the lower portion of said element forming a receptacle for holding salt or the like and having an end conforming to the contour of the opening in the churn barrel with which opening it is in close proximity during the blending operation.

3. In a butter blender a portable frame adapted to be arranged adjacent a churn barrel, an independent blending element adjustably mounted on the portable frame, the upper portion of said element projecting longitudinally beyond the lower portion and forming a segment adapted to be positioned within the churn barrel, and a detachable platform on the lower portion of said element and having a deflector plate.

4. In a butter blender of the character described a combined blending element and salt reception platform fitted with a deflecting plate for the purposes set forth.

5. In a butter blender, a portable frame adapted to be arranged adjacent a churn barrel, an independent blending element adjustably mounted on the portable frame, the upper portion of said element projecting longitudinally beyond the lower portion and forming a segment of a circle which when deposited in operative position within the churn barrel causes that portion of the butter at the time not passing through the workers of the churn on falling therefrom to be deposited on to said segment and directed so that the front end of such portion of butter is transferred to the rear of the churn and the rear portion transferred to the front of the churn for the purposes specified.

6. A butter blender comprising a portable frame, an independent blending element adjustably mounted on the portable frame adapted to be positioned in relation to a churn barrel during working operations in order to effect a blending of the butter within said churn, said blending element including a lower semi-cylindrical portion and an upper segmental portion projecting longitudinally from the lower portion, means for positioning and clamping said frame in operative position to retain the effective portion of the blending element in relation to butter workers within said churn and a cylindrical guard member surrounding the blending element for protecting the hands of the operator from the rotating element on the churn.

7. A butter blender comprising a frame adapted to be arranged adjacent a churn barrel and including a movable base, vertical standards on one end of the base and supports adjustably disposed on the upper ends of the standards, an independent stationary and reinforced blending element mounted on the supports, the effective portion of the element being disposed above said base and protruding beyond the said supports, clamping means pivotally secured to said base and adapted to register with guides positioned beneath a churn barrel, operating means for actuating the clamping means and disposed beneath the blending element and guard means for protecting the hands of the operator from the moving parts of the churn during operation.

8. In a butter blender, a portable frame, a blending element adjustably mounted on the upper part of the frame, horizontally extending shafts mounted on the opposite sides of the lower part of the frame, levers having their medial portions pivoted on the shafts, clamping grips detachably fastened to the lower ends of the levers, right and left handed screw threaded spindles respectively pivoted to the opposite ends of the levers and disposed in alignment, and a common control wheel operatively engaged with the threaded spindles.

JOSEPH O'CONNELL.
HAROLD HAMILTON KERR.